US008509293B2

(12) United States Patent
Sikri et al.

(10) Patent No.: US 8,509,293 B2
(45) Date of Patent: Aug. 13, 2013

(54) SEMI-COHERENT TIMING PROPAGATION FOR GERAN MULTISLOT CONFIGURATIONS

(75) Inventors: Divaydeep Sikri, Woking (GB); Erdogan Dede, Elvetham Heath (GB); Farrokh Abrishamkar, San Diego, CA (US); Philip J. C. Children, Farnborough (GB); Nico De Laurentiis, Farnborough Hampshire (GB)

(73) Assignee: QUALCOMM Incorporated, San Diego, CA (US)

( * ) Notice: Subject to any disclaimer, the term of this patent is extended or adjusted under 35 U.S.C. 154(b) by 628 days.

(21) Appl. No.: 12/193,925

(22) Filed: Aug. 19, 2008

(65) Prior Publication Data

US 2010/0046595 A1 Feb. 25, 2010

(51) Int. Cl.
*H04B 3/46* (2006.01)

(52) U.S. Cl.
USPC ........... 375/226; 375/260; 375/285; 375/284; 375/350; 375/346; 375/349; 375/348; 370/314; 370/345; 370/348; 370/349; 370/442; 370/473; 370/508; 370/510

(58) Field of Classification Search
USPC .............. 375/260, 285, 284, 350, 346, 349, 375/348, 226; 370/314, 345, 349, 442, 473, 370/508, 510
See application file for complete search history.

(56) References Cited

U.S. PATENT DOCUMENTS

| 5,267,249 | A | 11/1993 | Dong |
| 5,887,035 | A | 3/1999 | Molnar |
| 6,259,730 | B1 | 7/2001 | Solondz |
| 6,480,558 | B1 | 11/2002 | Ottosson et al. |
| 6,587,522 | B1 | 7/2003 | Wheeler et al. |
| 6,615,030 | B1 | 9/2003 | Saito et al. |
| 6,628,707 | B2 | 9/2003 | Rafie et al. |

(Continued)

FOREIGN PATENT DOCUMENTS

| CN | 1207835 A | 2/1999 |
| CN | 1736101 A | 2/2006 |

(Continued)

OTHER PUBLICATIONS

3GPP Draft; TR 25.814-V1.5.0, 3rd Generation Partnership Project (3GPP); Technical Specification Group Radio Access Network; Physical Layer Aspects for evolved UTRA (Release 7), 3GPP: France, May 26, 2006, (XP050102001), pp. 1-125.

(Continued)

*Primary Examiner* — Daniel Washburn
*Assistant Examiner* — Rahel Guarino
(74) *Attorney, Agent, or Firm* — Kevin T. Cheatham

(57) ABSTRACT

A method for estimating timing in a wireless communication comprises the steps of receiving a plurality of symbol bursts corresponding to a plurality of time slots and selecting a subset of symbols from a first symbol burst of the plurality of symbol bursts. The subset comprises a first midamble symbol. The method further comprises the steps of calculating, for each symbol in the subset, a corresponding midamble estimation error, and determining the lowest calculated midamble estimation error to determine a timing for the first symbol burst. The method further comprises the steps of processing the first symbol burst utilizing the timing determined for the first symbol burst, and processing a second symbol burst of the plurality of symbol bursts utilizing the timing determined for the first symbol burst.

24 Claims, 6 Drawing Sheets

(56) References Cited

U.S. PATENT DOCUMENTS

| | | |
|---|---|---|
| 6,765,894 B1 | 7/2004 | Hayashi |
| 6,771,689 B2 | 8/2004 | Solondz |
| 6,834,197 B2 | 12/2004 | Nakahara et al. |
| 6,907,092 B1 | 6/2005 | Yakhnich et al. |
| 6,931,030 B1 | 8/2005 | Dogan |
| 6,985,516 B1 | 1/2006 | Easton et al. |
| 7,013,147 B1 | 3/2006 | Kuwahara et al. |
| 7,107,031 B2 | 9/2006 | Kristensson et al. |
| 7,116,735 B2 | 10/2006 | Yamada et al. |
| 7,187,736 B2 | 3/2007 | Buckley et al. |
| 7,200,172 B2 | 4/2007 | Pukkila et al. |
| 7,295,636 B2 | 11/2007 | Onggosanusi et al. |
| 7,298,806 B1 | 11/2007 | Varma et al. |
| 7,308,056 B2 | 12/2007 | Pukkila et al. |
| 7,313,189 B2 | 12/2007 | Yoshida et al. |
| 7,620,662 B2 | 11/2009 | Kassai et al. |
| 7,693,210 B2 | 4/2010 | Margetts et al. |
| 7,706,430 B2 | 4/2010 | Guo et al. |
| 8,396,440 B2 | 3/2013 | Canpolat et al. |
| 2002/0132625 A1 | 9/2002 | Ogino et al. |
| 2002/0181557 A1 | 12/2002 | Fujii |
| 2003/0112370 A1 | 6/2003 | Long et al. |
| 2003/0119451 A1 | 6/2003 | Jang et al. |
| 2004/0001563 A1 | 1/2004 | Scarpa |
| 2004/0017311 A1 | 1/2004 | Thomas et al. |
| 2004/0043746 A1 | 3/2004 | Hiramatsu |
| 2004/0081248 A1 | 4/2004 | Parolari |
| 2004/0116122 A1 | 6/2004 | Zeira et al. |
| 2004/0203913 A1 | 10/2004 | Ogino et al. |
| 2004/0223538 A1 | 11/2004 | Zeira |
| 2005/0084045 A1 | 4/2005 | Stewart et al. |
| 2005/0111408 A1 | 5/2005 | Skillermark et al. |
| 2005/0147024 A1 | 7/2005 | Jung et al. |
| 2005/0153695 A1 | 7/2005 | Cho |
| 2005/0232174 A1 | 10/2005 | Onggosanusi et al. |
| 2005/0265465 A1 | 12/2005 | Hosur et al. |
| 2005/0277429 A1 | 12/2005 | Laroia et al. |
| 2006/0109938 A1 | 5/2006 | Challa et al. |
| 2006/0126765 A1 | 6/2006 | Shin et al. |
| 2006/0146953 A1 | 7/2006 | Raghothaman et al. |
| 2006/0146969 A1 | 7/2006 | Zhang et al. |
| 2006/0203943 A1 | 9/2006 | Scheim et al. |
| 2006/0209982 A1 | 9/2006 | De Gaudenzi et al. |
| 2006/0227853 A1 | 10/2006 | Liang et al. |
| 2006/0234715 A1 | 10/2006 | Cho et al. |
| 2007/0058709 A1 | 3/2007 | Chen et al. |
| 2007/0063897 A1 | 3/2007 | Matsuda |
| 2007/0071145 A1 | 3/2007 | Perets |
| 2007/0121764 A1 | 5/2007 | Chen et al. |
| 2007/0127608 A1 | 6/2007 | Scheim et al. |
| 2007/0183483 A1 | 8/2007 | Narayan et al. |
| 2007/0201548 A1 | 8/2007 | Badri-Hoeher et al. |
| 2007/0273698 A1 | 11/2007 | Du et al. |
| 2008/0019467 A1 | 1/2008 | He |
| 2008/0031368 A1 | 2/2008 | Lindoff et al. |
| 2008/0125070 A1 | 5/2008 | Grieco et al. |
| 2008/0212462 A1 | 9/2008 | Ahn et al. |
| 2008/0227456 A1 | 9/2008 | Huang et al. |
| 2008/0232439 A1 | 9/2008 | Chen |
| 2008/0298521 A1 | 12/2008 | Wu |
| 2008/0298524 A1 | 12/2008 | Koorapaty et al. |
| 2009/0052591 A1 | 2/2009 | Chen |
| 2009/0058728 A1 | 3/2009 | Mostafa et al. |
| 2009/0092178 A1 | 4/2009 | Sayana et al. |
| 2009/0207944 A1 | 8/2009 | Furman et al. |
| 2009/0213971 A1* | 8/2009 | Park et al. .................. 375/357 |
| 2010/0027702 A1 | 2/2010 | Vijayan et al. |
| 2010/0029213 A1 | 2/2010 | Wang |
| 2010/0029262 A1 | 2/2010 | Wang et al. |
| 2010/0040035 A1 | 2/2010 | Shapiro et al. |
| 2010/0046660 A1 | 2/2010 | Sikri et al. |
| 2010/0046682 A1 | 2/2010 | Sikri et al. |
| 2010/0054212 A1 | 3/2010 | Tang |
| 2010/0202544 A1 | 8/2010 | Osseirar et al. |
| 2010/0248666 A1 | 9/2010 | Hui et al. |
| 2010/0278227 A1 | 11/2010 | Sikri et al. |
| 2010/0296556 A1 | 11/2010 | Rave et al. |
| 2010/0310026 A1 | 12/2010 | Sikri et al. |
| 2011/0051859 A1 | 3/2011 | Canpolat et al. |
| 2011/0051864 A1 | 3/2011 | Chalia et al. |
| 2011/0305303 A1 | 12/2011 | Sikri et al. |

FOREIGN PATENT DOCUMENTS

| | | |
|---|---|---|
| CN | 1906862 A | 1/2007 |
| EP | 0396403 A1 | 11/1990 |
| EP | 0969608 A2 | 1/2000 |
| EP | 1347611 A1 | 9/2003 |
| EP | 1404047 A2 | 3/2004 |
| EP | 1411693 A2 | 4/2004 |
| EP | 1569399 A1 | 8/2005 |
| EP | 1681775 A2 | 7/2006 |
| EP | 1699194 A1 | 9/2006 |
| EP | 1699195 A1 | 9/2006 |
| EP | 1928138 A2 | 6/2008 |
| JP | 2000059290 A | 2/2000 |
| JP | 2000261397 A | 9/2000 |
| JP | 2001166026 A | 6/2001 |
| JP | 3210915 B2 | 9/2001 |
| JP | 2001257626 A | 9/2001 |
| JP | 2001267987 A | 9/2001 |
| JP | 2002507342 A | 3/2002 |
| JP | 2002539711 A | 11/2002 |
| JP | 2003051762 A | 2/2003 |
| JP | 2004048307 A | 2/2004 |
| JP | 2004112094 A | 4/2004 |
| JP | 2004511189 A | 4/2004 |
| JP | 2005065197 A | 3/2005 |
| JP | 2005510940 A | 4/2005 |
| JP | 2006191587 A | 7/2006 |
| JP | 2009545219 A | 12/2009 |
| KR | 20010085143 A | 9/2001 |
| KR | 1020050097552 A | 10/2005 |
| RU | 2211531 C2 | 8/2003 |
| RU | 2233033 C2 | 7/2004 |
| RU | 2280329 C1 | 7/2006 |
| RU | 2301493 | 6/2007 |
| RU | 2319307 C2 | 3/2008 |
| TW | 365717 | 8/1999 |
| TW | 200640202 | 11/2006 |
| WO | 9857509 A2 | 12/1998 |
| WO | 9912273 | 3/1999 |
| WO | 0035117 | 6/2000 |
| WO | 0055992 A1 | 9/2000 |
| WO | 0232003 A1 | 4/2002 |
| WO | WO02067444 A1 | 8/2002 |
| WO | 03047124 A1 | 6/2003 |
| WO | 2004010573 A1 | 1/2004 |
| WO | WO2004066666 | 8/2004 |
| WO | 2004107768 A2 | 12/2004 |
| WO | 2005053177 A1 | 6/2005 |
| WO | 2007000620 A1 | 1/2007 |
| WO | 2007029958 A1 | 3/2007 |
| WO | 2007060093 A1 | 5/2007 |
| WO | WO2007060229 A1 | 5/2007 |
| WO | WO2008012265 A1 | 1/2008 |
| WO | WO2009108586 A2 | 9/2009 |
| WO | WO2009140338 A2 | 11/2009 |
| WO | 2011028978 | 3/2011 |

OTHER PUBLICATIONS

Huaiyu, D. et al., "Asymptotic spectral efficiency of multi cell MIMO systems with frequency-flat fading," IEEE Transactions on Signal Processing, IEEE Service Center, New York, NY, US, vol. 51, No. 11, Nov. 1, 2003, pp. 2976-2988, XP011102811.

International Search Report and Written Opinion—PCT/US2009/053962, International Search Authority—European Patent Office—Nov. 19, 2009.

Meyr, H. et al., "Chapter 5: Synthesis of Synchronization Algorithms" and "Chapter 8: Frequency Estimation," Jan. 1, 1998, Digital Communication Receivers: Synchronization, Channel Estimation, and Signal Processing; John Wiley and Sons, Inc.: New York, pp. 271-323,445, XP002547568.

Pais, A.V., et al., "Indoor DS-CDMA system deployment and performance with successive interference cancellation," Electronics Letters: GB, vol. 40, No. 19, Sep. 16, 2004, pp. 1200-1201, XP006022654.

Ritt: "Performance of IDMA-based inter-cell interference cancellation," 3GPP Draft TSG-RAN WG1 #44-bis Meeting, R1-060895, 3rd Generation Partnership Project (3GPP), Athens, Greece; Mar. 27, 2006, XP050101801, pp. 1-5.

Sawahashi M., et al., "Multipath Interference Canceller for Orthogonal Multiplexed Channel and its Performance in W-CDMA Forward Link," Technical Report of the Institute of Electronics, Information and Communication Engineers, Jan. 12, 2001, vol. 100, No. 558, pp. 27-33, RCS2000-195.

Chunguang, W., et al., "Enhanced OTDOA Technology in 3G Location Service", Shanghai Research Institute of China Telecom, Shanghai 200122, China, Aug. 31, 2005.

Natali F.D., "AFC Tracking Algorithms" IEEE Transactions on Communications, IEEE Service Center, Piscataway, NJ, US, vol. COM-32, No. 8, Aug. 1, 1984, pp. 935-947, XP000758571 ISSN: 0090-6778 abstract p. 941, section C.

Olivier J.C., et al., "Single antenna interference cancellation for synchronised GSM networks using a widely linear receiver" (Feb. 1, 2007) pp. 131-136, XP006028092.

The study of Interference Cancellation based on Multi-User Detection, Mar. 27, 2008.

* cited by examiner

SEMI-COHERENT TIMING PROPAGATION FOR GERAN MULTISLOT CONFIGURATIONS

REFERENCE TO CO-PENDING APPLICATIONS FOR PATENT

The present Application for Patent is related to co-pending U.S. patent application Ser. No. 12/038,724, filed Feb. 27, 2008, and entitled "COHERENT SINGLE ANTENNA INTERFERENCE CANCELLATION FOR GSM/GPRS/EDGE," assigned to the assignee hereof, and expressly incorporated by reference herein.

BACKGROUND

1. Field

The present invention relates to wireless communication and, in particular, relates to coherent single antenna interference cancellation.

2. Background

In many communication systems utilizing GSM, GPRS, EDGE or the like, a receiver's ability to properly decode a received signal depends upon the receiver's ability to maintain accurate symbol timing. As wireless communications become ever more prevalent, however, increasing amounts of interference can negatively impact a receiver's ability to maintain this timing.

SUMMARY

According to one aspect of the subject technology, a method for estimating timing in a wireless communication comprises the steps of receiving a plurality of symbol bursts corresponding to a plurality of time slots and selecting a subset of symbols from a first symbol burst of the plurality of symbol bursts. The subset comprises a first midamble symbol. The method further comprises the steps of calculating, for each symbol in the subset, a corresponding midamble estimation error, and determining the lowest calculated midamble estimation error to determine a timing for the first symbol burst. The method further comprises the steps of processing the first symbol burst utilizing the timing determined for the first symbol burst, and processing a second symbol burst of the plurality of symbol bursts utilizing the timing determined for the first symbol burst.

According to another aspect of the subject technology, a receiver comprises an antenna configured to receive a plurality of symbol bursts corresponding to a plurality of time slots, and a timing estimator configured to select a subset of symbols from a first symbol burst of the plurality of symbol bursts. The subset comprises a first midamble symbol. The receiver further comprises a midamble estimator configured to calculate, for each symbol in the subset, a corresponding midamble estimation error, and a processor. The processor is configured to determine the lowest calculated midamble estimation error to determine a timing for the first symbol burst, process the first symbol burst utilizing the timing determined for the first symbol burst, and process a second symbol burst of the plurality of symbol bursts utilizing the timing determined for the first symbol burst.

According to yet another aspect of the subject technology, a receiver comprises means for receiving a plurality of symbol bursts corresponding to a plurality of time slots, and means for selecting a subset of symbols from a first symbol burst of the plurality of symbol bursts. The subset comprises a first midamble symbol. The receiver further comprises means for calculating, for each symbol in the subset, a corresponding midamble estimation error, means for determining the lowest calculated midamble estimation error to determine a timing for the first symbol burst, means for processing the first symbol burst utilizing the timing determined for the first symbol burst, and means for processing a second symbol burst of the plurality of symbol bursts utilizing the timing determined for the first symbol burst.

According to yet another aspect of the subject technology, a machine-readable medium comprises instructions for estimating timing in a wireless communication. The instructions comprise code for receiving a plurality of symbol bursts corresponding to a plurality of time slots and selecting a subset of symbols from a first symbol burst of the plurality of symbol bursts. The subset comprising a first midamble symbol. The instructions further comprise code for calculating, for each symbol in the subset, a corresponding midamble estimation error, determining the lowest calculated midamble estimation error to determine a timing for the first symbol burst, processing the first symbol burst utilizing the timing determined for the first symbol burst, and processing a second symbol burst of the plurality of symbol bursts utilizing the timing determined for the first symbol burst.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
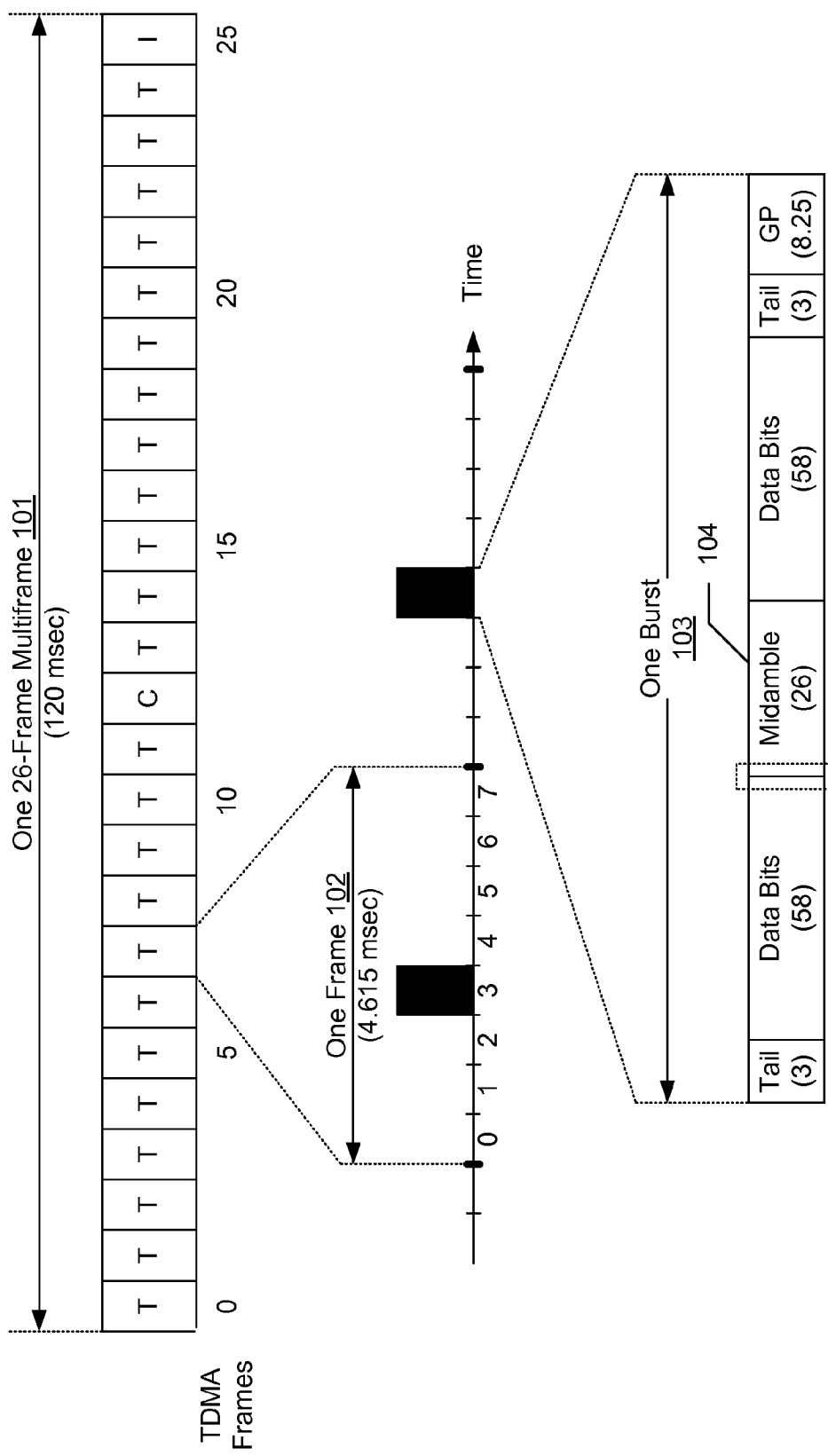
FIG. 1 illustrates exemplary frame and burst formats in GSM in accordance with one aspect of the subject technology.

FIG. 1 shows exemplary frame and burst formats in GSM. The timeline for downlink transmission is divided into multiframes. For traffic channels used to send user-specific data, each multiframe, such as exemplary multiframe 101, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 1. A control channel, identified by the letter "C," is sent in TDMA frame 12. No data is sent in the idle TDMA frame 25 (identified by the letter "T"), which is used by the wireless devices to make measurements for neighbor base stations.

Each TDMA frame, such as exemplary TDMA frame 102, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 103, includes two tail fields, two data fields, a training sequence (or midamble) field, and a guard period (GP). The number of bits in each field is shown inside the parentheses. GSM defines eight different training sequences that may be sent in the training sequence field. Each training sequence, such as midamble 104, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of ±1, ±2, ±3, ±4, and ±5, and (3) a zero or non-zero value for all other time shifts.

One approach to locating a midamble in a burst of symbols serially compares hypotheses regarding the midamble position to determine which hypothesis provides the highest correlation energy between the known midamble sequence and the hypothesized position in the burst of symbols. This method is very sensitive to interference from multi-paths of the same midamble sequence, which can cause the correlation energy of inaccurate hypotheses to be affected by time-delayed copies thereof. This method is also sensitive to co-channel and adjacent channel interference.

Figure 2:
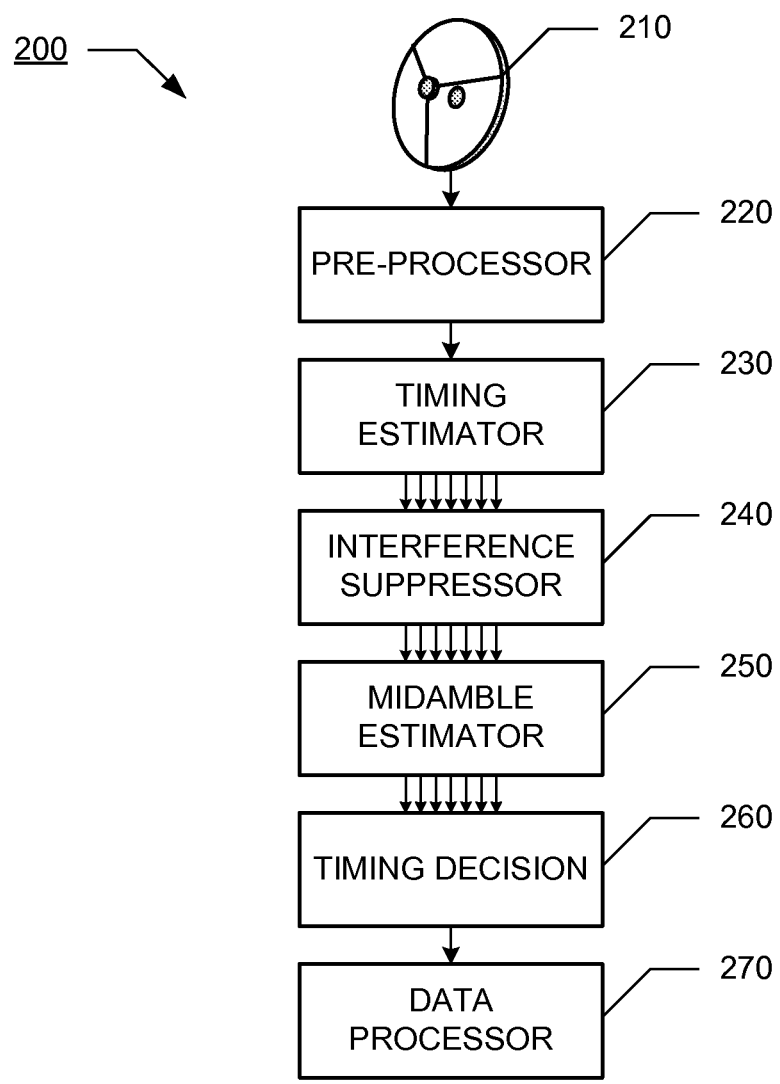
FIG. 2 illustrates a receiver for use in a wireless communication system in accordance with one aspect of the subject technology.

FIG. 2 illustrates a receiver for use in a wireless communication system in accordance with one aspect of the subject technology. Receiver 200 includes an antenna 210 configured to receive a wireless signal. While receiver 200 may be used in various communication systems, for clarity, receiver 200 is specifically described herein with respect to a GSM system. The received signal is provided to a pre-processor 220 which demodulates the signal to generate received samples. Pre-processor 220 may include a GMSK-to-BPSK rotator that performs phase rotation on the received samples. Timing estimator 230 receives the samples from pre-processor 220 and makes several hypotheses regarding where a training sequence of symbols (i.e., midamble) begins in the burst of data, to provide several hypothetical channel estimates. Interference suppressor 240 performs single antenna interference cancellation on each of the hypothesized channels, and midamble estimator 250 generates a midamble estimation error for each hypothesis. Timing decision circuit 260 compares the midamble estimation errors for each hypothesis and selects the hypothesis with the lowest midamble estimation error. The selection of a hypothesis by timing decision circuit 260 represents the position in the burst of symbols where the midamble is estimated to begin. Data processor 270 then processes the received symbols based upon this estimated timing, and outputs the data corresponding to the received symbols.

According to one aspect of the present invention, the foregoing semi-coherent timing estimation method is very robust under strong interference conditions. Accordingly, in a frame with multiple time slots, the timing estimation may be performed on one time slot, and the estimated timing can be propagated to the subsequent slots, providing exceptional savings in computational loads at the receiver, while still delivering a very robust timing estimation. Since each time slot is of the same duration (e.g., in GSM, 156.25 symbols long or 577 μs), propagation of the timing estimation is computationally trivial. According to one aspect, the timing of a timeslot $TS_{n+1}$ can simply be determined by adding the duration of the time slots in that communication format to the timing of the previous time slot: $Timing(TS_{n+1})=Timing(TS_n)+156.25\ T_s$. According to one aspect, the foregoing method for timing estimation may be performed for the first time slot in a frame, and the resultant estimated timing may be propagated to every subsequent time slot in the same frame. Alternately, timing estimation may be performed for any one of the time slots in a frame, including but not limited to the first slot, and the resultant timing estimation may be propagated to any subsequent time slot in the same frame, whether or not the time slots are contiguous (e.g., a timing estimate could be propagated to a non-contiguous time slot by merely adding the appropriate duration to the timing estimate, such as the duration of two time slots, the duration of three time slots, etc.). For example, in accordance with one aspect, multiple time slots within a frame may be assigned to the same user, and it may be desirable to propagate a timing estimate determined according to the foregoing method for a first time slot assigned to that user to subsequent time slots assigned to the same user within the same frame.

Rather than utilizing a determined correlation energy to select which hypothesis regarding the midamble timing is accurate, timing estimator 230 performs single antenna interference cancellation ("SAIC") to provide an estimate of the symbols making up the training sequence, which are compared against the previously-known symbols of that training sequence to determine an estimation error therefor.

To begin the search for the first midamble symbol, timing estimator 230 opens a "window" around the estimated beginning of the midamble sequence. The position of the first symbol of the midamble sequence can be estimated for a given burst, based upon the known structure of each burst. For example, as illustrated in FIG. 1, the beginning of midamble 104 in burst 103 begins in the 62nd bit of the burst. Based upon this known structure, timing estimator 230 selects a window 105 of bits representing a series of hypotheses regarding where the first midamble symbol may be located. Exemplary window 105 is illustrated in greater detail in FIG. 3.

Figure 3:
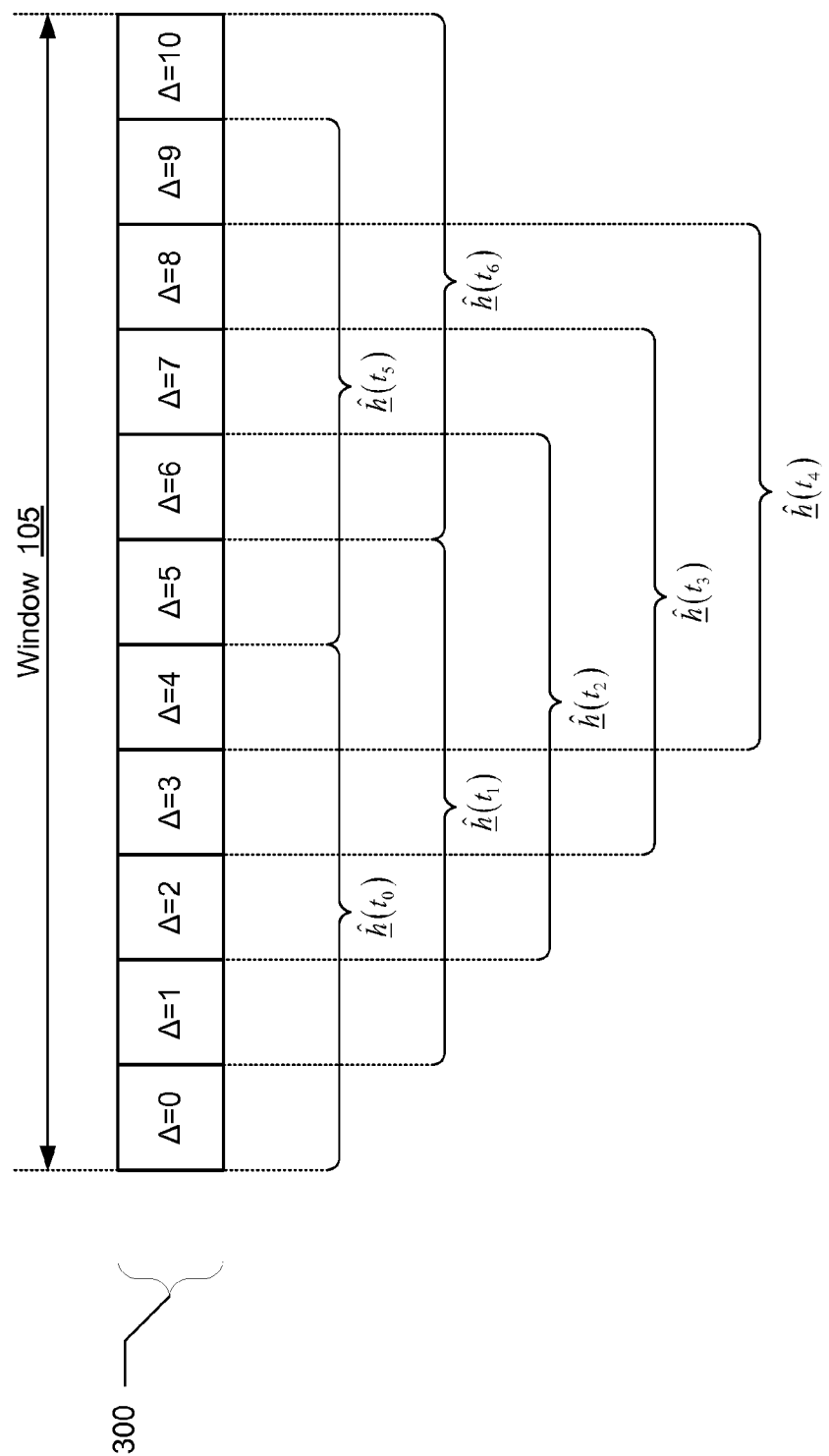
FIG. 3 illustrates a subset of symbols, including the first midamble symbol, that a receiver selects in accordance with one aspect of the subject technology.

As can be seen with reference to FIG. 3, exemplary window 105 comprises 11 symbols, labeled $\Delta=0$ to $\Delta=10$. Each $\Delta$ value represents the position of the symbol in the window. With reference to the position of a symbol in the entire burst, however, the $\Delta$ value is offset by an offset value (e.g., $\Delta=5$ may be offset by 61 to represent the position of this symbol in the entire burst). For the first seven symbols in window 105, timing estimator 230 generates a channel estimate from a sequence of five contiguous symbols (representing the five-tap channel format of GSM). For example, symbol $\Delta=0$ corresponds to channel estimate $\hat{h}(t_0)$, symbol $\Delta=1$ corresponds to channel estimate $\hat{h}(t_1)$, etc. Each of these channel estimates is then processed by interference suppressor 240 and midamble estimator 250 to determine estimated midamble symbols corresponding thereto, in order to determine a midamble estimation error therefor.

While in the present exemplary aspect, window 105 has been illustrated as consisting of exactly 11 symbols, the scope of the present invention is not limited to such an arrangement. Rather, as will be readily apparent to one of skill in the art, any window size (up to the size of the entire data burst) may be selected. For example, in accordance with one aspect of the subject technology, the size of the search window may be chosen to be twice the size of the expected minimum propagation delay. Alternatively, the search window size may be parameterized based on any other metric known to those of skill in the art.

According to one aspect, a channel estimate $\hat{h}$ is generated by timing estimator 230 by correlating the received samples (corresponding to the hypothesized delay) with the reference samples (i.e., the known midamble sequence) for each hypothesis. Based on the correlation $R_{ys}(\Delta)$ between received signal y and midamble sequence s for a hypothesized delay $\Delta$, the channel estimate may be calculated as follows:

$$h^{(\delta)} = [R_{ys}(\delta), R_{ys}(\delta+1), \ldots, R_{ys}(\delta+4)] \text{ for } \delta = 0, 1, \ldots, 6 \quad (1)$$

$$\delta^* = \underset{\delta}{\arg\max}\{\|h_1^{(\delta)}\|^2\} \quad (2)$$

$$\hat{h} = [R_{ys}(\delta^*) R_{ys}(\delta^*+1) \ldots R_{ys}(\delta^*+4)]. \quad (3)$$

To test the hypothesis corresponding to each channel estimate, interference suppressor 240 performs SAIC on each estimated channel. SAIC is a method by which oversampled and/or real/imaginary decomposition of a signal is used to provide virtual antennas with separate sample sequences, such that weights may be applied to the virtual antennas to form a beam in the direction of a desired transmitter and a beam null in the direction of an undesired interference source. In general, SAIC may be achieved with one or multiple actual antennas at the receiver by using space-time processing, where "space" may be virtually achieved with inphase and quadrature components, and "time" may be achieved using late and early samples.

For example, given a set of spatial and temporal samples at a time k:

$$x_k = \begin{bmatrix} x_k(1) \\ x_k(2) \\ \vdots \\ x_k(M) \end{bmatrix}, s_k = \begin{bmatrix} s_k \\ s_{k-1} \\ \vdots \\ s_{k-v} \end{bmatrix}$$

where $s_k$ is the midamble/quasi-midamble signal at time k, $s_k$ is a $(v+1) \times 1$ midamble/quasi-midamble vector, and $x_k$ is a $M \times 1$ received midamble/quasi-midamble vector, a set of spatial temporal samples can be defined as $$X_k = \begin{bmatrix} x_k \\ x_{k-1} \\ \vdots \\ x_{k-L} \end{bmatrix},$$

where $X_k$ is a $M \times (L+1) \times 1$ vector of spatial temporal samples with a spatial length of M and a temporal length of L+1. Accordingly, a spatial/temporal structured matrix can be constructed, such that $$[X] = [X_k X_{k+1} \ldots X_{k+p-v}],$$

where [X] is a M (L+1)×p−v matrix, and p is the length of the midamble or quasi-midamble (data aided).

Accordingly, given [X] and $\tilde{s}_k = [s_k, s_{k+1}, \ldots s_{k+p-v}]$, $(v+1) \times p-v$, a suppression filter $W_{SAIC}$ can be computed according to one aspect of the subject disclosure by estimating a reference sequence of symbols at the channel output:

$$W_{SAIC} = \arg\min \|W[X] - \tilde{Z}\|^2 \quad (4)$$

where $W = (v+1) \times M(L+1)$ and $\tilde{Z} = \tilde{s}_k, (v+1) \times (p-v)$.

The foregoing equation can be rewritten as $$W_{SAIC} = \tilde{Z}[X]^\dagger, (v+1) \times M(L+1) \quad (5)$$

or, more particularly, as $$W_{SAIC} = \tilde{s}_k[X]^T \{[X][X]^T\}^{-1}. \quad (6)$$

The output of interference suppressor 240 is in the form $\hat{S}$, where $\hat{S}$ represents an estimate of the midamble sequence. The difference between the estimated and known midamble sequences is determined according to Equation 7, below:

$$\|S - \hat{S}\|^2 = e_m(t_i) \quad (7)$$

to obtain a midamble estimation error $e_m(t_i)$ for each time $t_i$. Each time $t_i$ is equal to the hypothesized position $\Delta_i$ plus an offset $T_s$ from the beginning of the burst:

$$t_i = \Delta_i + T_s \quad (8)$$

Once the midamble estimation error $e_m(t_i)$ for each time $t_i$ is determined, timing decision block 260 determines which hypothesis corresponds to the lowest estimation error $e_m$, and the other hypothesized timing values are discarded.

According to one aspect of the subject disclosure, data processor 270 comprises a soft output generator that receives the signal from timing decision block 260 and generates soft decisions that indicate the confidence in the detected bits. A soft output generator may implement an Ono algorithm, as is well known to those of skill in the art. Data processor 270 may further comprise a de-interleaver that de-interleaves the soft decisions, and passes the soft decisions to a Viterbi decoder that decodes the deinterleaved soft decisions and outputs decoded data.

According to one aspect of the present invention, the foregoing semi-coherent timing estimation method is very robust under strong interference conditions. Accordingly, in a frame with multiple time slots, the timing estimation may be performed on one time slot, and the estimated timing can be propagated to the subsequent slots. Since each time slot is of the same duration (e.g., in GSM, 156.25 symbols long or 577 µs), propagation of the timing estimation is computationally trivial. According to one aspect, the timing of a timeslot $TS_{n+1}$ can simply be determined by adding the duration of the time slots in that communication format to the timing of the previous time slot: Timing $(TS_{n+1})$=Timing $(TS_n)$+156.25 $T_s$.

Figure 4:
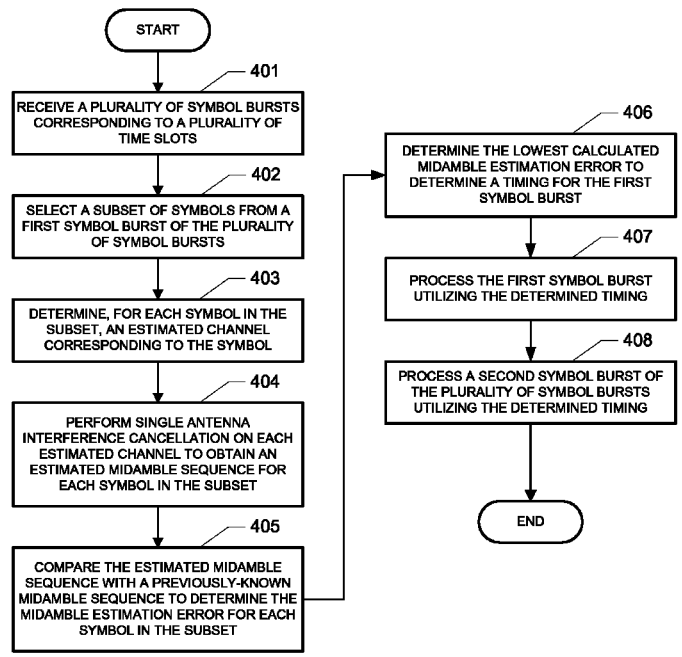
FIG. 4 illustrates a method for estimating timing in accordance with one aspect of the subject technology.

FIG. 4 is a flow chart illustrating a method for interference suppression in accordance with one aspect of the subject technology. The method begins with step 401, in which a plurality of symbol bursts are received. The plurality of symbol bursts correspond to a plurality of time slots, such as, for example, the time slots in a GSM EDGE radio network (GE-RAN) format wireless communication. In step 402, a subset of symbols are selected from a first symbol burst of the plurality of symbol bursts. The subset comprises a first midamble symbol of the first symbol burst. For each symbol in the subset, an estimated channel corresponding to the symbol is determined in step 403. Single antenna interference cancellation is performed on each estimated channel in step 404 to obtain an estimated midamble sequence for each symbol in the subset. In step 405, the estimated midamble sequence is compared with a previously-known midamble sequence to determine the midamble estimation error for each symbol in the subset. The lowest calculated midamble estimation error is determined in step 406 to determine a timing for the first symbol burst. In step 407, the first symbol burst is processed (e.g., soft decisions generated, de-interleaved and decoded) utilizing the timing determined for the first symbol burst. In step 408, a second symbol burst of the plurality of symbol bursts is decoded utilizing the timing determined for the first symbol burst. The second symbol burst corresponds to a time slot in the same frame as and subsequent to the time slot corresponding to the first symbol burst. The second time slot may be assigned to carry data traffic for the same user as the first time slot, as discussed in greater detail above.

Figure 5:
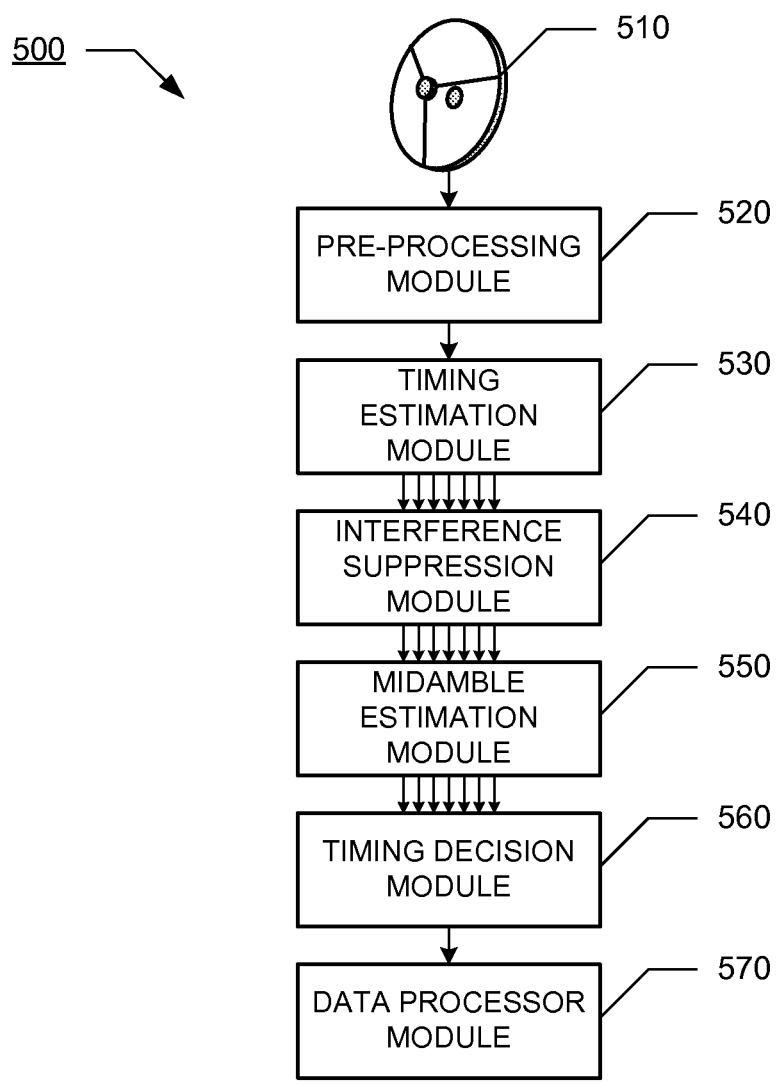
FIG. 5 illustrates a receiver for use in a wireless communication system in accordance with one aspect of the subject technology.

FIG. 5 illustrates a receiver for use in a wireless communication system in accordance with one aspect of the subject technology. Receiver 500 includes an antenna module 510 configured to receive a wireless signal comprising a plurality of symbol bursts in a plurality of time slots such as, for example, an RF modulated GSM signal in a GSM EDGE radio network (GERAN). One of the symbol bursts of the received signal is provided to a pre-processor module 520 which demodulates the signal to generate received samples. Pre-processor module 520 may also include a GMSK-to-BPSK rotator that performs phase rotation on the received samples. Timing estimation module 530 receives the samples from pre-processing module 520 and makes several hypotheses regarding where a training sequence of symbols (midamble) begins in the burst of symbols, to provide several hypothetical channel estimates. Interference suppression module 540 performs single antenna interference cancellation by calculating a plurality of filter weights for each hypothesis and then applying the filter, with the calculated weights, to each channel estimate hypothesis. Midamble estimation module 550 generates a midamble estimation error for each hypothesis, and timing decision module 560 compares the midamble estimation errors for each hypothesis and selects the hypothesis with the lowest midamble estimation error. The selection of a hypothesis by timing decision module 560 represents the position in the burst of symbols where the midamble is estimated to begin. Utilizing the selected timing hypothesis, the received samples are provided to processor module 570, which processes the received symbols based upon the selected timing hypothesis, and outputs the data corresponding to the received symbols. Utilizing the same selected timing hypothesis, processor module 570 also processes the received symbols from additional bursts of symbols corresponding to additional time slots in the same frame. The additional time slots may, according to one aspect, be assigned to a same user.

While in the foregoing exemplary embodiments, the interference suppression filter has been described as a single antenna interference cancellation filter, the scope of the present invention is not limited to such an embodiment. Rather, as will be apparent to those of skill in the art, the subject technology has application to systems with more than one antenna, which may perform, for example, dual antenna interference cancellation ("DAIC"), or any other multiple-antenna interference cancellation method, well known to those in the art.

Figure 6:
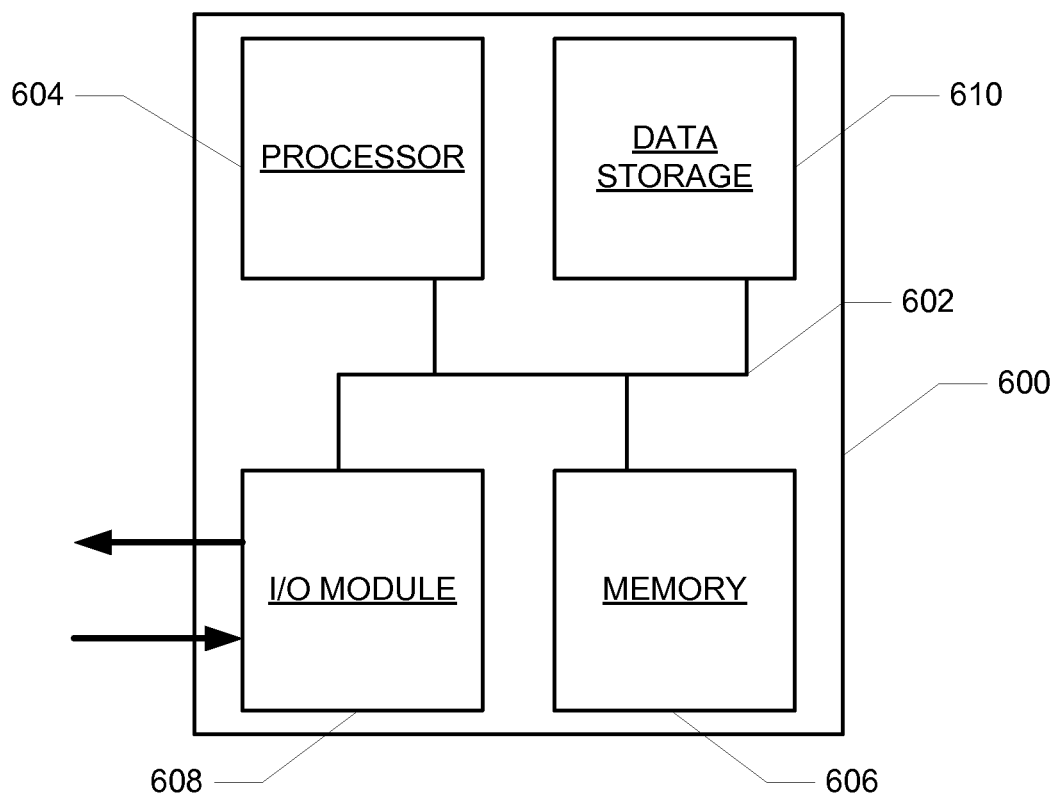
FIG. 6 is a block diagram illustrating a computer system with which certain aspects of the subject technology may be implemented.

FIG. 6 is a block diagram that illustrates a computer system 600 upon which an aspect may be implemented. Computer system 600 includes a bus 602 or other communication mechanism for communicating information, and a processor 604 coupled with bus 602 for processing information. Computer system 600 also includes a memory 606, such as a random access memory ("RAM") or other dynamic storage device, coupled to bus 602 for storing information and instructions to be executed by processor 604. Memory 606 may also be used for storing temporary variable or other intermediate information during execution of instructions to be executed by processor 604. Computer system 600 further includes a data storage device 610, such as a magnetic disk or optical disk, coupled to bus 602 for storing information and instructions.

Computer system 600 may be coupled via I/O module 608 to a display device (not illustrated), such as a cathode ray tube ("CRT") or liquid crystal display ("LCD") for displaying information to a computer user. An input device, such as, for example, a keyboard or a mouse may also be coupled to computer system 600 via I/O module 608 for communicating information and command selections to processor 604.

According to one aspect, timing estimation is performed by a computer system 600 in response to processor 604 executing one or more sequences of one or more instructions contained in memory 606. Such instructions may be read into memory 606 from another machine-readable medium, such as data storage device 610. Execution of the sequences of instructions contained in main memory 606 causes processor 604 to perform the process steps described herein. One or more processors in a multi-processing arrangement may also be employed to execute the sequences of instructions contained in memory 606. In alternative aspects, hard-wired circuitry may be used in place of or in combination with software instructions to implement various aspects. Thus, aspects are not limited to any specific combination of hardware circuitry and software.

The term "machine-readable medium" as used herein refers to any medium that participates in providing instructions to processor 604 for execution. Such a medium may take many forms, including, but not limited to, non-volatile media, volatile media, and transmission media. Non-volatile media include, for example, optical or magnetic disks, such as data storage device 610. Volatile media include dynamic memory, such as memory 606. Transmission media include coaxial cables, copper wire, and fiber optics, including the wires that comprise bus 602. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for estimating timing in a wireless communication by a receiver, comprising the steps of:
   receiving a plurality of symbol bursts corresponding to a plurality of time slots;
   selecting a subset of symbols from a first symbol burst of the plurality of symbol bursts, the subset comprising a first midamble symbol;
   calculating, for each symbol in the subset, a corresponding midamble estimation error;
   determining the lowest calculated midamble estimation error to determine a timing for the first symbol burst;
   processing the first symbol burst utilizing the timing determined for the first symbol burst; and
   processing a second symbol burst of the plurality of symbol bursts utilizing the timing determined for the first symbol burst.

2. The method according to claim 1, wherein the calculating the midamble estimation error for each symbol in the subset comprises:
   determining an estimated channel corresponding to the symbol;
   performing single antenna interference cancellation on the estimated channel to obtain an estimated midamble sequence; and
   comparing the estimated midamble sequence with a previously-known midamble sequence to determine the midamble estimation error.

3. The method according to claim 2, wherein the calculating the midamble estimation error for each symbol in the subset further comprises:
   performing single antenna interference cancellation on the estimated channel to obtain an estimated data sequence for the first symbol burst; and
   comparing the estimated data sequence with a previously-determined data sequence to determine the midamble estimation error.

4. The method according to claim 2, wherein the determining the estimated channel corresponding to each symbol comprises selecting a predetermined number of adjacent symbols in the subset corresponding to a number of taps in the estimated channel.

5. The method according to claim 1, wherein the selecting a subset of the first symbol burst comprises estimating a position of the first midamble symbol in the first symbol burst and selecting a plurality of symbols centered around the estimated position.

6. The method according to claim 1, wherein the first symbol burst and the second symbol burst correspond to first and second time slots assigned to a single user.

7. A receiver comprising:
   an antenna configured to receive a plurality of symbol bursts corresponding to a plurality of time slots;
   a timing estimator configured to select a subset of symbols from a first symbol burst of the plurality of symbol bursts, the subset comprising a first midamble symbol;
   a midamble estimator configured to calculate, for each symbol in the subset, a corresponding midamble estimation error; and
   a processor configured to:
      determine the lowest calculated midamble estimation error to determine a timing for the first symbol burst,
      process the first symbol burst utilizing the timing determined for the first symbol burst, and
      process a second symbol burst of the plurality of symbol bursts utilizing the timing determined for the first symbol burst.

8. The receiver according to claim 7, wherein the midamble estimator is configured to calculate the midamble estimation error for each symbol in the subset by:
   determining an estimated channel corresponding to the symbol;
   performing single antenna interference cancellation on the estimated channel to obtain an estimated midamble sequence; and
   comparing the estimated midamble sequence with a previously-known midamble sequence to determine the midamble estimation error.

9. The receiver according to claim 8, wherein the midamble estimator is further configured to calculate the midamble estimation error for each symbol in the subset by:
   performing single antenna interference cancellation on the estimated channel to obtain an estimated data sequence for the first symbol burst; and
   comparing the estimated data sequence with a previously-determined data sequence to determine the midamble estimation error.

10. The receiver according to claim 8, wherein the processor is configured to determine the estimated channel corresponding to each symbol by selecting a predetermined number of adjacent symbols in the subset corresponding to a number of taps in the estimated channel.

11. The receiver according to claim 7, wherein the timing estimator is configured to select a subset of the first symbol burst by estimating a position of the first midamble symbol in the first symbol burst and selecting a plurality of symbols centered around the estimated position.

12. The receiver according to claim 7, wherein the first symbol burst and the second symbol burst correspond to first and second time slots assigned to a single user.

13. A receiver comprising:
   means for receiving a plurality of symbol bursts corresponding to a plurality of time slots;
   means for selecting a subset of symbols from a first symbol burst of the plurality of symbol bursts, the subset comprising a first midamble symbol;
   means for calculating, for each symbol in the subset, a corresponding midamble estimation error;
   means for determining the lowest calculated midamble estimation error to determine a timing for the first symbol burst;

means for processing the first symbol burst utilizing the timing determined for the first symbol burst; and means for processing a second symbol burst of the plurality of symbol bursts utilizing the timing determined for the first symbol burst.

14. The receiver according to claim 13, wherein the means for calculating the midamble estimation error for each symbol in the subset comprise:

means for determining an estimated channel corresponding to the symbol;

means for performing single antenna interference cancellation on the estimated channel to obtain an estimated midamble sequence; and means for comparing the estimated midamble sequence with a previously-known midamble sequence to determine the midamble estimation error.

15. The receiver according to claim 14, wherein the means for calculating the midamble estimation error for each symbol in the subset further comprise:

means for performing single antenna interference cancellation on the estimated channel to obtain an estimated data sequence for the first symbol burst; and means for comparing the estimated data sequence with a previously-determined data sequence to determine the midamble estimation error.

16. The receiver according to claim 14, wherein the means for determining the estimated channel corresponding to each symbol comprise means for selecting a predetermined number of adjacent symbols in the subset corresponding to a number of taps in the estimated channel.

17. The receiver according to claim 13, wherein the means for selecting a subset of the first symbol burst comprise means for estimating a position of the first midamble symbol in the first symbol burst and means for selecting a plurality of symbols centered around the estimated position.

18. The receiver according to claim 13, wherein the first symbol burst and the second symbol burst correspond to first and second time slots assigned to a single user.

19. A non-transitory machine-readable medium comprising instructions for estimating timing in a wireless communication, the instructions comprising code for:

receiving a plurality of symbol bursts corresponding to a plurality of time slots;

selecting a subset of symbols from a first symbol burst of the plurality of symbol bursts, the subset comprising a first midamble symbol;

calculating, for each symbol in the subset, a corresponding midamble estimation error;

determining the lowest calculated midamble estimation error to determine a timing for the first symbol burst;

processing the first symbol burst utilizing the timing determined for the first symbol burst; and processing a second symbol burst of the plurality of symbol bursts utilizing the timing determined for the first symbol burst.

20. The non-transitory machine-readable medium according to claim 19, wherein the code for calculating the midamble estimation error for each symbol in the subset comprises code for:

determining an estimated channel corresponding to the symbol;

performing single antenna interference cancellation on the estimated channel to obtain an estimated midamble sequence; and comparing the estimated midamble sequence with a previously-known midamble sequence to determine the midamble estimation error.

21. The non-transitory machine-readable medium according to claim 20, wherein the code for calculating the midamble estimation error for each symbol in the subset further comprises code for:

performing single antenna interference cancellation on the estimated channel to obtain an estimated data sequence for the first symbol burst; and comparing the estimated data sequence with a previously-determined data sequence to determine the midamble estimation error.

22. The non-transitory machine-readable medium according to claim 20, wherein the code for determining the estimated channel corresponding to each symbol comprises code for selecting a predetermined number of adjacent symbols in the subset corresponding to a number of taps in the estimated channel.

23. The non-transitory machine-readable medium according to claim 19, wherein the code for selecting a subset of the first symbol burst comprises code for estimating a position of the first midamble symbol in the first symbol burst and code for selecting a plurality of symbols centered around the estimated position.

24. The non-transitory machine-readable medium according to claim 19, wherein the first symbol burst and the second symbol burst correspond to first and second time slots assigned to a single user.

* * * * *